United States Patent
Weidenaar (10) Patent No.: US 11,648,812 B2
(45) Date of Patent: May 16, 2023

(54) NO ROLL TORSION BAR

(71) Applicant: Toyota Motor Engineering & Manufacturing North America, Inc., Plano, TX (US)

(72) Inventor: Aaron Weidenaar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 259 days.

(21) Appl. No.: 17/000,127

(22) Filed: Aug. 21, 2020

(65) Prior Publication Data

US 2022/0055437 A1     Feb. 24, 2022

(51) Int. Cl.
    *B60G 21/045*     (2006.01)
    *B60G 21/08*      (2006.01)

(52) U.S. Cl.
    CPC .......... *B60G 21/045* (2013.01); *B60G 21/08* (2013.01); *B60G 2202/132* (2013.01); *B60G 2204/62* (2013.01); *B60G 2400/0511* (2013.01); *B60G 2400/0512* (2013.01); *B60G 2400/0523* (2013.01); *B60G 2400/252* (2013.01); *B60G 2400/52* (2013.01); *B60G 2400/60* (2013.01); *B60G 2401/28* (2013.01); *B60G 2500/30* (2013.01); *B60G 2800/914* (2013.01)

(58) Field of Classification Search
    CPC ................. B60G 21/08; B60G 21/045; B60G 2202/132; B60G 2204/62; B60G 2400/0511; B60G 2400/0512; B60G 2400/0523; B60G 2400/252; B60G 2400/60; B60G 2401/28; B60G 2500/30; B60G 2800/914
    See application file for complete search history.

(56) References Cited

U.S. PATENT DOCUMENTS

| | | | |
|---|---|---|---|
| 7,726,666 B2 | 6/2010 | Grannemann et al. | |
| 8,191,911 B1 * | 6/2012 | Reynolds ................. | B60G 3/20 280/124.13 |
| 8,356,557 B2 | 1/2013 | Schneider | |
| 8,573,621 B1 * | 11/2013 | Reynolds ............. | B60G 11/225 280/124.13 |
| 10,166,833 B2 | 1/2019 | Groen et al. | |

(Continued)

FOREIGN PATENT DOCUMENTS

| | | | |
|---|---|---|---|
| CN | 104129249 A | * | 11/2014 |
| CN | 208931061 U | * | 6/2019 |

(Continued)

*Primary Examiner* — Paul N Dickson
*Assistant Examiner* — Matthew D Lee
(74) *Attorney, Agent, or Firm* — Snell & Wilmer LLP (57) ABSTRACT

Methods, systems, devices and apparatuses for a torsion bar system. The torsion bar system includes a first torsion bar. The first torsion bar is configured to adjust a ride height of a first wheel of a vehicle. The torsion bar system includes a first actuator. The first actuator is coupled to the first torsion bar. The first actuator is configured to control a load on the first torsion bar. The torsion bar system includes an electronic control unit. The electronic control unit is coupled to the first actuator. The electronic control unit is configured to set a position of the first torsion bar using the first actuator and based on the load on the first torsion bar.

21 Claims, 6 Drawing Sheets

(56) References Cited

U.S. PATENT DOCUMENTS

| | | | | |
|---|---|---|---|---|
| 2005/0093265 A1* | 5/2005 | Niaura | ............... | B60G 17/0432 |
| | | | | 280/124.16 |
| 2017/0240018 A1* | 8/2017 | Mettrick | ............ | B60G 17/0182 |
| 2017/0361672 A1* | 12/2017 | Ahmadian | ............ | B60G 17/019 |
| 2019/0009632 A1 | 1/2019 | Holt et al. | | |
| 2019/0337523 A1* | 11/2019 | Rogness | ............... | B60W 40/13 |
| 2020/0016951 A1* | 1/2020 | Letizio | ................. | B60G 99/008 |
| 2021/0260952 A1* | 8/2021 | Saylor | ................ | B60G 17/0162 |

FOREIGN PATENT DOCUMENTS

| | | | | |
|---|---|---|---|---|
| CN | 113650466 A | * | 11/2021 | |
| DE | 102009047108 A1 | | 5/2011 | |
| DE | 102015103328 A1 | * | 9/2016 | |
| EP | 3409515 B1 | * | 11/2019 | ......... B60G 17/0157 |
| JP | 2006082751 A | | 3/2006 | |

\* cited by examiner

NO ROLL TORSION BAR

BACKGROUND

Field

This disclosure relates to a system, method, apparatus and/or device to improve the ride quality of a ride of a vehicle.

Description of the Related Art

Torsion bar suspensions are used on modern vehicles, such as trucks and sport utility vehicles (SUVs). The torsion bar suspensions allow for a soft ride due to their elasticity, durability, adjustability of the ride height and small profile along the width of the vehicle. A torsion bar suspension uses a torsion bar as its main weight-bearing spring. One end is attached to the vehicle chassis and the opposite end terminates in a level, such as a torsion key, mounted perpendicular to the bar, that is attached to a suspension arm, a spindle or the axle of the vehicle. While the ride height may be adjusted by turning adjuster bolts on the torsion key, rotating the torsion key too far can bend the adjuster bolts place the shock piston outside its standard travel. Over-rotating the torsion bars can also cause the suspension to hit the bump-stop prematurely, causing a harsh ride.

Typically, torsion bar suspensions have a torsion bar adjuster that allows a person to loosen or tighten the torsion bar, which allows for fixed height adjustment of the ride height where the ride height remains fixed until a user re-adjusts the torsion bar to adjust the pre-load that manages the ride height, e.g., by bolting or unbolting the torsion bar. The pre-load, however, remains fixed during the entire ride and until the user manually re-adjusts the torsion bar via the torsion bar adjuster.

Accordingly, there is a need for a system, apparatus and/or method to control the load on the torsion bar to adjust a ride height on-the-fly and/or during use of the vehicle.

SUMMARY

In general, one aspect of the subject matter described in this disclosure may be embodied in an active torsion bar system ("torsion bar system"). The torsion bar system includes a first torsion bar. The first torsion bar is configured to adjust a ride height of a first wheel of a vehicle. The torsion bar system includes a first actuator. The first actuator is coupled to the first torsion bar. The first actuator is configured to control a load on the first torsion bar. The torsion bar system includes an electronic control unit. The electronic control unit is coupled to the first actuator. The electronic control unit is configured to set a position of the first torsion bar using the first actuator and based on the load on the first torsion bar.

These and other embodiments may optionally include one or more of the following features. In order to set the position of the first torsion bar, the electronic control unit is configured to cause the first actuator to wind the first torsion bar to increase the ride height of the first wheel or cause the first actuator to unwind the first torsion bar to decrease the ride height of the first wheel.

The torsion bar system may include a sensor. The sensor may be configured to detect sensor data. The electronic control unit may be configured to determine the load on the first torsion bar based on the sensor data. The sensor may be a camera. The camera may be positioned on a front of the vehicle or a rear of the vehicle. The sensor may be configured to capture image data. The electronic control unit may be configured to recognize an object or a change in a path in the image data. The electronic control unit may be configured to set the position of the first torsion bar before the vehicle traverses the object or the path.

The torsion bar system may include a second torsion bar. The second torsion bar may be configured to adjust a second ride height of a second wheel of the vehicle. The torsion bar system may include a second actuator. The second actuator may be coupled to the second torsion bar. The electronic control unit may be coupled to the second actuator and may be configured to set a position of the second torsion bar using the second actuator and may be based on the load on the second torsion bar. The electronic control unit may be configured to set the position of the second torsion bar independently of the position of the first torsion bar.

The electronic control unit may be configured to cause the first actuator to wind the first torsion bar to increase the ride height when the driving mode is the sport mode. The electronic control unit may be configured to cause the first actuator to unwind the first torsion bar to decrease the ride height when the driving mode is the luxury mode. The torsion bar system may include a height sensor on each wheel of the vehicle. The height sensor may be configured to measure a height of each wheel of the vehicle. The electronic control unit may be configured to determine a roll of the vehicle based on the height of each wheel. The electronic control unit may be configured to set the position of the first torsion bar based on the roll of the vehicle.

The torsion bar system may include a yaw sensor. The yaw sensor may include an accelerometer or gyroscope. The yaw sensor may be configured to measure an angular velocity of the vehicle around a vertical axis. The torsion bar system includes a pitch sensor. The pitch sensor may be configured to measure a pitch about a lateral axis of the vehicle. The electronic control unit may be configured to set the position of the first torsion bar based on the angular velocity or the pitch of the vehicle.

In another aspect, the subject matter may be embodied in a torsion bar system. The torsion bar system includes a first torsion bar. The first torsion bar is configured to adjust a ride height of a first wheel of a vehicle. The torsion bar system includes a first actuator. The first actuator is coupled to the first torsion bar and is configured to apply a first torque to wind or unwind the first torsion bar. The torsion bar system includes an electronic control unit. The electronic control unit is coupled to the first actuator and configured to set a position of the first torsion bar using the first actuator.

In another aspect, the subject matter may be embodied in a method for adjusting a ride height of a vehicle. The method includes obtaining, by a processor, sensor data. The method includes determining, by the processor, a load or an amount of torque to apply to a torsion bar of the vehicle based on the sensor data. The method includes winding or unwinding the first torsion bar based on the load or the amount of torque to apply to decrease or increase the ride height.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for an active torsion bar suspension system (or "torsion bar system") that actively controls, manages or adjusts a load or pre-load on the torsion bar. The torsion bar system may control, manage or adjust the load or the pre-load on the torsion bar automatically, on-the-fly and/or in real-time. By controlling, managing or adjusting the load or the pre-load on the torsion bar, the torsion bar system may wind or unwind the tension within the torsion bar on-the-fly, which increases or decreases resistance to adjust the ride height of the vehicle. The resistance of the torsion bar to the twisting has the same effect as a spring used in more conventional suspension systems and a certain amount of the load is applied to the torsion bar, which causes the ride to be softer or harder due to the load. This improves the comfort of the driver and passengers during the ride. For example, as the vehicle traverses over a speed bump or other obstacle, the torsion bar system may increase the tension or wind the torsion bar to increase the ride height, which softens the overall ride as the vehicle traverses over the speed bump or other obstacle.

Other benefits and advantages include the capability to monitor various parameters of the ride and automatically adjust the torsion bar on-the-fly and in response to the monitored parameters. For example, the torsion bar system may detect a change in one or more parameters, such as the yaw, roll or pitch of the vehicle, and adjust the torsion bar to adjust the ride height of a wheel, accordingly. This allows the torsion bar system to automatically adjust the ride height, and consequently, the comfort of the occupants of the vehicle automatically during the ride.

Additionally, the torsion bar system may control each torsion bar that is coupled to different wheels independently. For example, the torsion bar system may raise or lower the ride height of the front passenger-side wheel while simultaneously raising or lowering the ride height of the rear driver-side wheel independently. This further enhances the comfort of the occupants of the vehicle as the ride heights of each wheel of the vehicle is independently adjustable to be responsive to surface features or objects that are driven over by each wheel.

Figure 1:
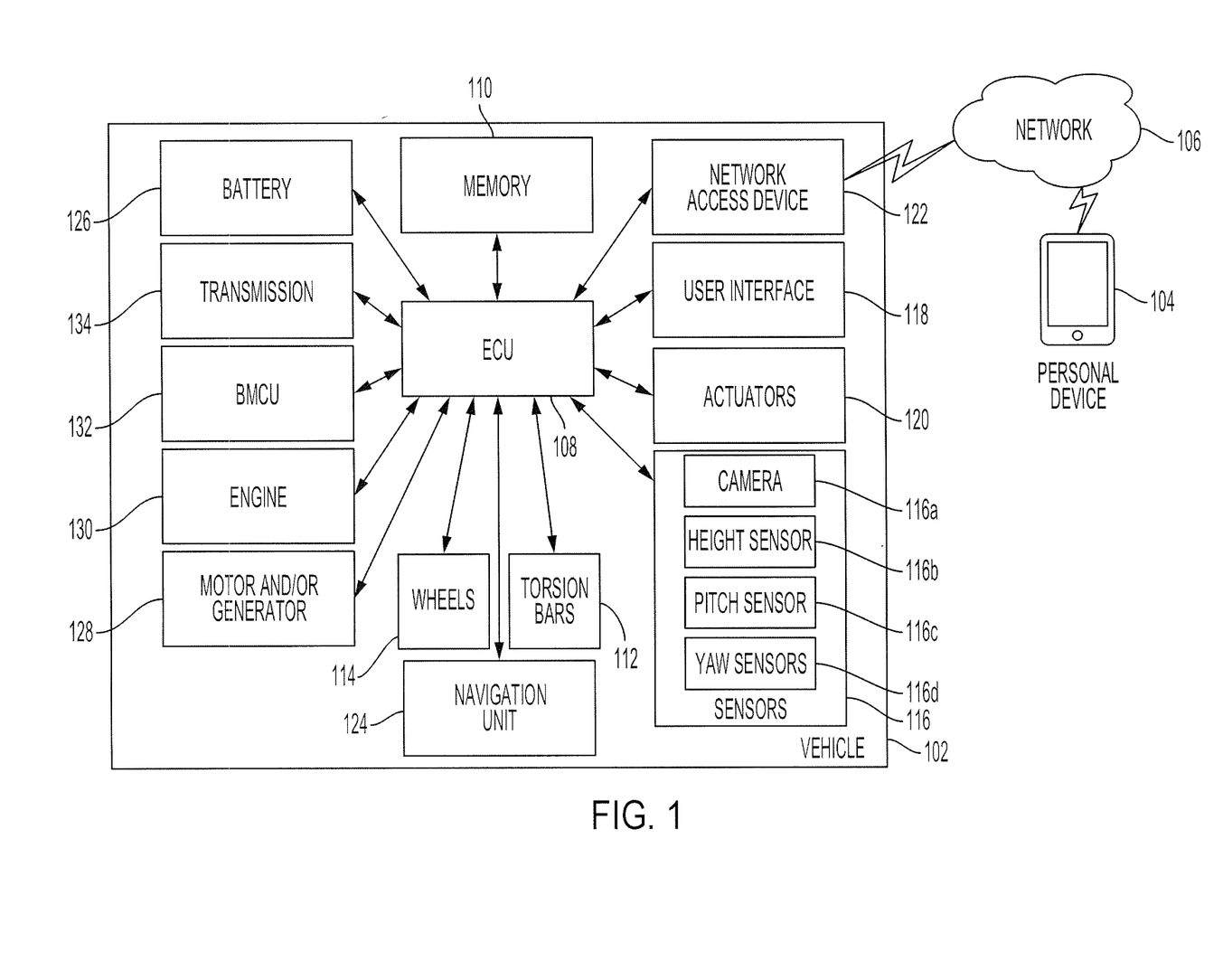
FIG. 1 shows a block diagram of an example active torsion bar system according to an aspect of the invention.

FIG. 1 is a block diagram of an active torsion bar suspension system (or "torsion bar system") 100. The torsion bar system 100 or a portion thereof may be retro-fitted, coupled to, include or be included within a vehicle 102 or separate from the vehicle 102. The torsion bar system 100 may adjust or control one or more torsion bars 112 of the vehicle 102 to adjust the ride height of one or more wheels 114 of the vehicle 102. By adjusting the ride height of the one or more wheels 114 of the vehicle 102, the torsion bar system 100 adjusts the "ride" or ride quality of the vehicle's effectiveness in insulating the occupants from undulations in the road surface (e.g., bumps or corrugations). A vehicle 102 with good ride quality provides comfort to the driver, passenger and other occupants of the vehicle 102.

The torsion bar system 100 may have or use a network 106 to communicate among different components, such as among the vehicle 102 and/or a personal device 104. The personal device 104 may be used as a user interface to control, adjust or set a position of one or more torsion bars 112 of the vehicle 102 to adjust the ride heights of the different wheels 114 of the vehicle 102. The personal device may be, for example, a personal computer, a laptop, a tablet, a smartphone or other personal or wearable smart device. The network 106 may be a Dedicated Short-Range Communication (DSRC) network, a local area network (LAN), a wide area network (WAN), a cellular network, the Internet, or combination thereof, that connects, couples and/or otherwise communicates among the different components of the torsion bar system 100.

The torsion bar system 100 may include, be included within or be retro-fitted to the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

Figure 2:
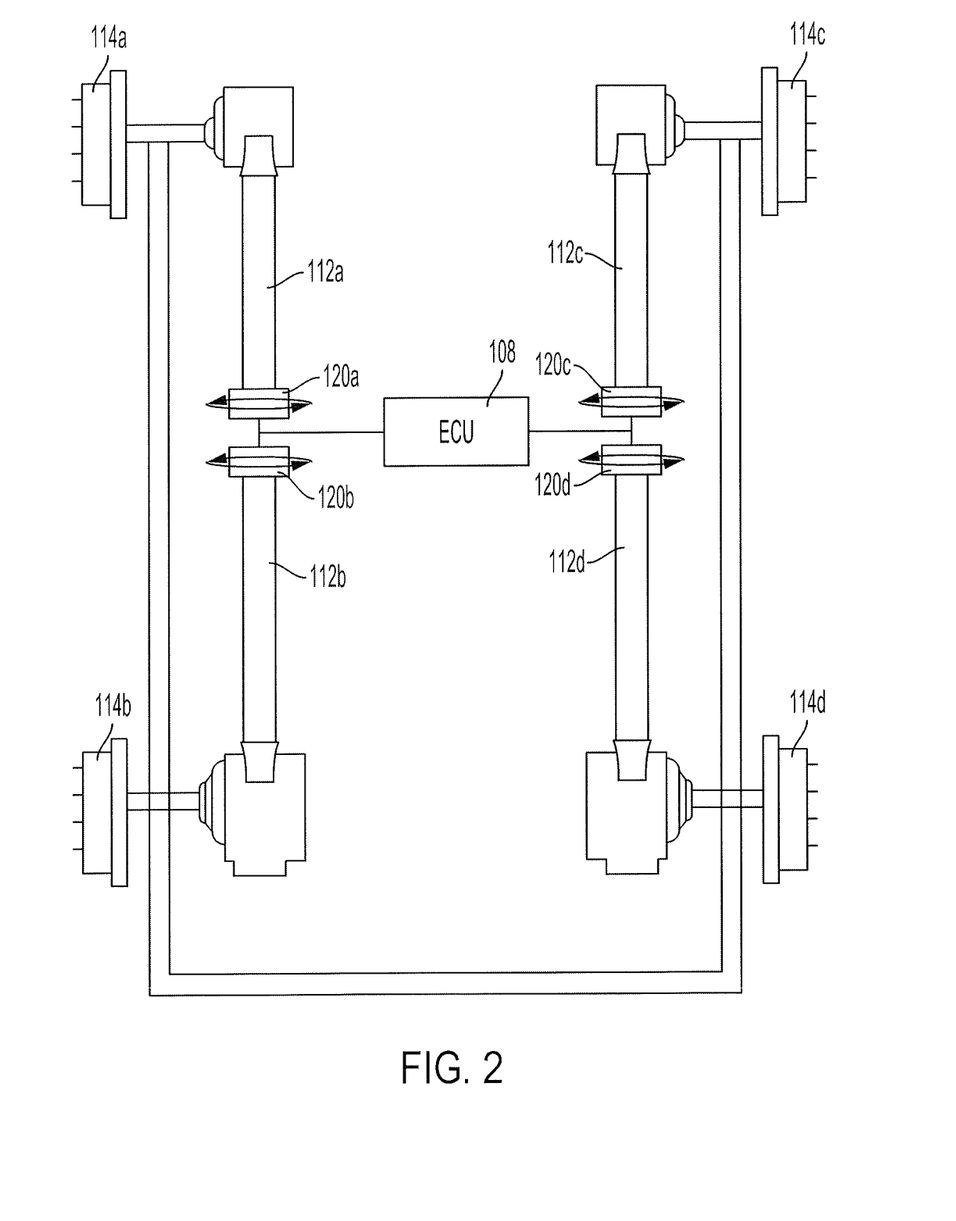
FIG. 2 shows a diagram of the interconnection of various components of the active torsion bar system of FIG. 1 according to an aspect of the invention.

The vehicle 102 may have one or more wheels 114, which are used to move the vehicle 102. The torsion bar system 100 may include one or more torsion bars 112. A torsion bar 112 may be a metal bar that acts as a weight-bearing spring. When there is a vertical motion on the wheel, the torsion bar 112 may twist around its axis and is resisted by the bar's torsion resistance. The effective spring rate of the torsion bar may be determined by its length, cross section, shape, material and manufacturing process. The one or more torsion bars 112 may each be coupled to a corresponding wheel of the one or more wheels 114. Each of the one or more torsion bars 112 may be independent of the other torsion bars 112 to allow for independent control and/or adjustment of the ride height of the corresponding wheel of the one or more wheels 114, as shown in FIG. 2 for example. That is, the torsion bar system 100 may independently control or set a position for each of the one or more torsion bars 112, e.g., using one or more actuators 120 which independently control the ride height of the corresponding wheel 114 so that the torsion bar system 100 may raise or lower the ride height of one wheel without affecting the control of the ride height of another wheel. The torsion bar system 100 may control each torsion bar 112 independently without a sway bar or other coupling component. By removing the sway bar, the wheel articulation, which may be measured by a ramp travel index (RTI), is improved, e.g., the difference between the ride heights of the passenger and driver-side wheels is not limited. Moreover, by removing the sway, bar or other coupling component between two or more torsion bars 112, the overall costs and weight of the torsion bar system 100 are reduced.

The torsion bar system may have one or more actuators 120. The one or more actuators 120 may be coupled to the one or more torsion bars 112. The one or more actuators 120 may be a device that receives a control signal and a source of energy to twist or wind, e.g., to apply more torque, the torsion bar 112, or untwist or unwind, e.g., to release the torque, the torsion bar 112 to adjust the ride height of the one or more wheels 114.

Each actuator 120 of the one or more actuators 120 may be coupled to a corresponding torsion bar 112 that controls the ride height of a corresponding wheel 114 of the vehicle 102. Each of the one or more actuators 120 may be independent of the other actuators of the one or more actuators 120.

The torsion bar system 100 includes one or more processors, such as the electronic control unit (ECU) 108. The one or more processors, such as the ECU 108, may be implemented as a single processor or as multiple processors. For example, the one or more processors may be a microprocessor, data processor, microcontroller or other controller, and may be electrically coupled to some or all the other components within the vehicle 102. The one or more processors may obtain sensor data from one or more sensors 116 and/or user input from the user interface 118 to be used to adjust the ride height of the wheels 114 of the vehicle 102. The one or more processors may control one or more actuators 120 to set the position of the one or more torsion bars 112 to control the ride height of the wheels 114 of the vehicle 102.

The memory 110 may be coupled to the ECU 108. The memory 110 may include one or more of a Random Access Memory (RAM), Read Only Memory (ROM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. The memory 110 may store one or more configuration settings or mappings that associate different values of the sensor data and/or the user input to a corresponding load or pre-load on the one or more torsion bars 112, which affects the ride height of the one or more wheels 114.

The torsion bar system 100 may include a user interface 118. The user interface 118 may include an input device that receives user input from a user interface element, a button, a dial, a microphone, a keyboard, or a touch screen. For example, the touch screen may include a graphical user interface or menu for a drive mode selector. The drive mode selector may have various modes including but not limited to a luxury mode, a normal mode, an economy mode and/or a sport mode. Each of the different modes may be associated with a different level of ride quality, e.g., more or less body roll, that is desired by the occupants of the vehicle when traversing across an undulation in the road surface, which may affect the load or pre-load applied to each of the one or more torsion bars 112.

The user input may include one or more configuration settings. The one or more configuration settings may indicate a default or a pre-ride amount of load or pre-load to apply to each of the one or more torsion bars 112 before a road trip begins. The user input may indicate one or more thresholds, such as a height of the wheel or the pitch or yaw of the vehicle 102, which may trigger an adjustment of the position of one or more torsion bars 112 to adjust the ride height of the one or more wheels 114.

The user interface 118 may include, provide or be coupled to an output device, such as a display or other visual indicator. The user interface 118 may provide notifications, warnings or alerts, for example. The user interface 118 may provide additional information including the ride height of the one or more wheels 114 or the sensor data.

The torsion bar system 100 may include a network access device 122. The network access device 122 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 122 may transmit data to and receive data from the different components the torsion bar system 100, such as the vehicle 102 and/or the personal device 104.

The torsion bar system 100 may include one or more sensors 116. The one or more sensors 116 may include a camera 116a. The camera 116a may be positioned on a front and/or a rear of the vehicle 102. The camera 116a may be positioned on the front of the vehicle 102 and may record and/or capture image data of the path in front of the vehicle 102 as the vehicle 102 is moving forward. The image data may include one or more undulations in the road or surface that may be in the path of the vehicle 102 as the vehicle 102 is moving forward. The camera 116a may be positioned on the rear of the vehicle 102 and may record and/or capture image data of the path behind the vehicle 102 as the vehicle 102 is moving in reverse. The image data may include one or more undulations in the road or surface that may be in the path of the vehicle 102 as the vehicle 102 is moving in reverse.

Figure 5:
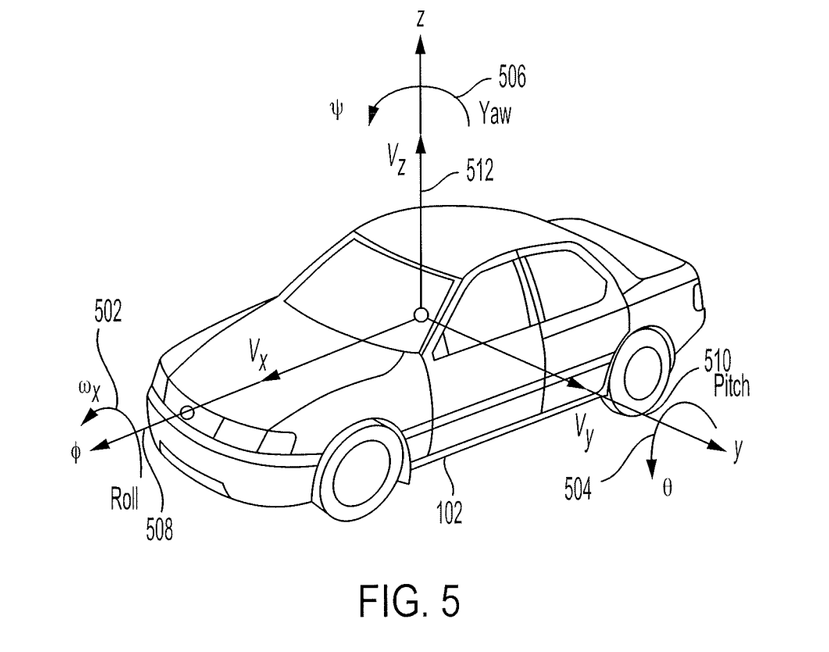
FIG. 5 is a diagram of various angles and/or orientations of the vehicle that are measured using the active torsion bar system of FIG. 1 to adjust the ride height of the wheels of the vehicle according to an aspect of the invention.

The one or more sensors 116 may measure various angles and/or orientations of the vehicle 102 about various axes, which may affect the ride quality of the ride. The various angles and/or orientations of the vehicle 102 may include the roll 502, the pitch 504 and/or the yaw 506, as shown in FIG. 5 for example.

The one or more sensors 116 may include one or more height sensors 116b. The one or more height sensors 116b may be positioned near or in proximity to a corresponding wheel 114 of the vehicle 102. The height sensor 116b may measure a height of the corresponding wheel 114 relative to the surface of the road or other surface. The torsion bar system 100 may measure the height of each wheel of the vehicle 102 and determine the roll 502 of the vehicle 102 based on the height of each wheel. The roll 502 of the vehicle 102 defines the distribution of the weight of the vehicle 102 while the vehicle 102 is turning, e.g., the clockwise and/or counter-clockwise movement of the vehicle 102 about an axis 508 through the front of the vehicle 102. By determining the roll 502 of the vehicle 102, the torsion bar system 100 may adjust the ride height of one or more wheels 114 in response to the roll 502 of the vehicle 102 to balance the vehicle 102 when at least one height of one wheel is disproportionately higher or lower than the other wheels of the vehicle 102.

The one or more sensors 116 may include a pitch sensor 116c. The pitch sensor 116c may be configured to measure the pitch 504 of the vehicle 102 about a lateral axis 510 of the vehicle 102. The pitch 504 of the vehicle 102 is a measure of the height in the vehicle's weight forwards or backwards, which may cause the front end of the vehicle 102 to drop or lift and the rear end of the vehicle 102 to lift or drop, respectively. The one or more sensors 116 may include a yaw sensor 116d. The yaw sensor may be an accelerometer and/or a gyroscopic device that measures a vehicle's yaw 506 or yaw rate, or angular velocity around its vertical axis 512.

The torsion bar system 100 may be coupled to one or more vehicle components of the vehicle 102. The one or more vehicle components may include a navigation unit 124. The navigation unit 124 may be integral to the vehicle 102 or a separate unit. The vehicle 102 may include a Global Positioning System (GPS) unit (not shown) for detecting location data including a current location of the vehicle 102 and date/time information instead of the navigation unit 124. In some implementations, the ECU 108 may perform the functions of the navigation unit 124 based on data received from the GPS unit. The navigation unit 124 or the ECU 108 may perform navigation functions. Navigation functions may include, for example, route and route set prediction, providing navigation instructions, and receiving user input such as verification of predicted routes and route sets or destinations. The navigation unit 124 may be used to obtain navigational map information. The navigational map information may include a starting location of the vehicle 102, a current location of the vehicle 102, a destination location, a route between the starting location of the vehicle 102 and the destination location and/or date/time information.

The one or more vehicle components may include a motor and/or generator 128. The motor and/or generator 128 may convert electrical energy into mechanical power, such as torque, and may convert mechanical power into electrical energy. The motor and/or generator 128 may be coupled to the battery 126. The motor and/or generator 128 may convert the energy from the battery 126 into mechanical power, and may provide energy back to the battery 126, for example, via regenerative braking. The one or more vehicle components may include one or more additional power generation devices, such as an engine 130 or a fuel cell stack (not shown). The engine 130 combusts fuel to provide power instead of and/or in addition to the power supplied by the motor and/or generator 128.

The battery 126 may be coupled to the motor and/or generator 128 and may supply electrical energy to and receive electrical energy from the motor and/or generator 128. The battery 126 may include one or more rechargeable batteries and may supply the power to the torsion bar system 100.

The battery management control unit (BMCU) 132 may be coupled to the battery 126 and may control and manage the charging and discharging of the battery 126. The BMCU 132, for example, may measure, using battery sensors, parameters used to determine the state of charge (SOC) of the battery 126. The BMCU 132 may control the battery 126.

The one or more vehicle components may include a transmission 134. The transmission may have one or more gears, a drivetrain, a clutch and/or a drive shaft. The transmission 134 converts the power from the engine 130 to move the wheels 114 of the vehicle 102.

FIG. 2 shows the interconnection of various components of the torsion bar system 100. The torsion bar system 100 may have an electronic control unit 108, one or more torsion bars 112, one or more actuators 120 and one or more wheels 114. The electronic control unit 108 may independently control each of the one or more actuators 120, such as the actuators 120a-d. And since each of the torsion bars 112a-d are independent of each other, the electronic control unit 108 may control each actuator 120a-d to adjust the position of each torsion bar 112a-d independently. The electronic control unit 108 may twist or wind the corresponding torsion bar 112a-d to apply a torque to or set a position of the corresponding torsion bar 112a-d that sets the load or the pre-load of the corresponding torsion bar 112a-d. For example, the electronic control unit 108 may cause the actuator 120a to wind the torsion bar 112a a first amount, cause the actuator 120b to wind the torsion bar 112b a second amount, cause the actuator 120c to unwind the torsion bar 112c a third amount and/or cause the actuator 120d to unwind the torsion bar 112d a fourth amount. The first, second, third and fourth amounts may be the same and/or different. This allows the ride height of each wheel 114a-d to each be individually adjusted independently of the adjustments to the ride heights of the other wheels 114a-d.

For example, when the vehicle 102 is approaching an undulation, a pothole or other obstacle in the road surface that may be traversed only by the passenger-side wheels 114c-d, the electronic control unit 108 may only need to adjust the ride heights of the wheels 114c-d, e.g., by adjusting the position of the torsion bars 112c-d. In another example, when the vehicle 102 is pitched upward, such as when there is a heavy load on the rear of the vehicle 102, which causes the rear of the vehicle 102 to angle downward and the front of the vehicle 102 to angle upward, the electronic control unit 108 may cause actuators 120b, 120d to untwist or unwind, such as in a counter-clockwise motion, the torsion bars 112b, 112d to decrease the ride height of the wheels 114b, 114d and resist the weight and/or cause the actuators 120a, 120c to twist or wind, such as in a clockwise motion, the torsion bars 112a, 112c to increase the ride height of the wheels 114a, 114c to keep the wheels 114a, 114c on the ground.

Figure 3:
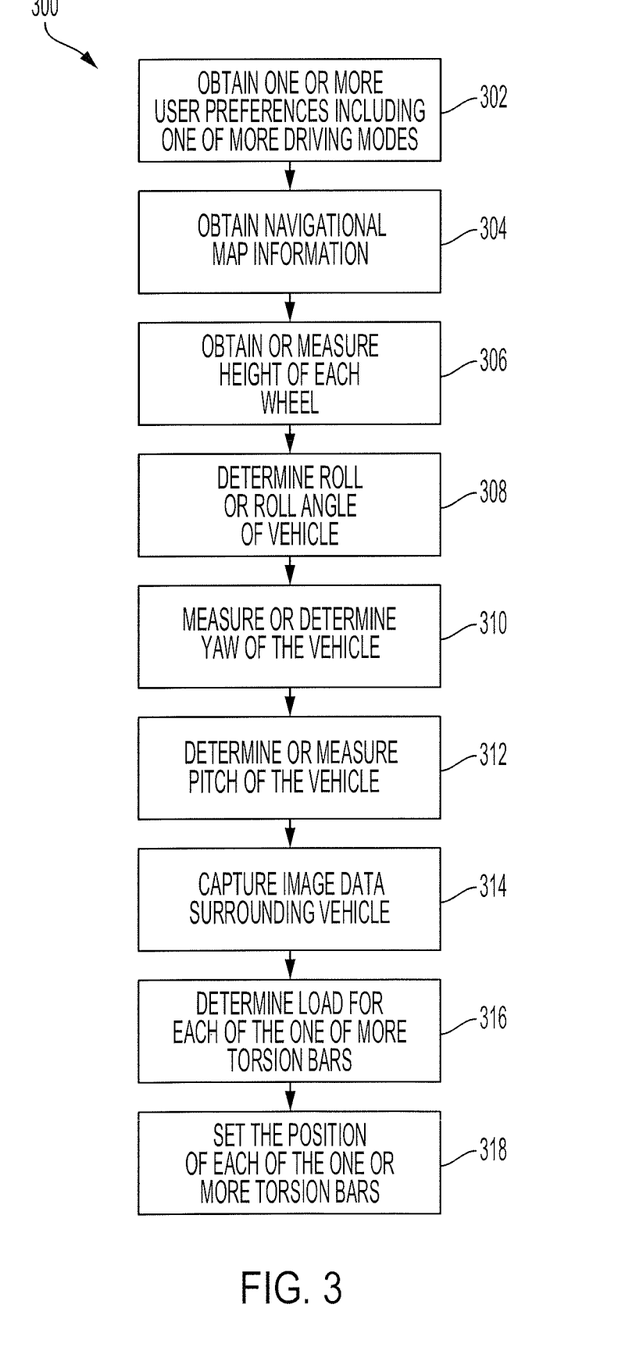
FIG. 3 is a flow diagram of an example process for setting the load or pre-load of the one or more torsion bars using the active torsion bar system of FIG. 1 according to an aspect of the invention.

FIG. 3 is a flow diagram of a process 300 for setting the position of the one or more torsion bars 112. One or more computers or one or more data processing apparatuses, for example, the ECU 108 of the torsion bar system 100 of FIG. 1, appropriately programmed, may implement the process 300. The torsion bar system 100 may be used to adjust the load or pre-load (hereinafter, referred to as "load") on the one or more torsion bars 112. This allows the torsion bar system 100 to adjust the ride height of each wheel 114 on-the-fly and/or automatically throughout a ride even when the vehicle 102 is moving and traversing across the road surface, which improves the ride quality of the ride. The torsion bar system 100 may obtain or determine various parameters of the environment surrounding the vehicle 102, such as sensor data from one or more sensors 116, and/or user preferences, such as a driving mode from a drive mode selector, to determine the load on the torsion bar 112 to set the vehicle ride height to provide the desired ride quality.

The torsion bar system 100 may obtain one or more user preferences including one or more driving modes that indicate a desired ride quality (302). The torsion bar system 100 may obtain the driving mode via a user interface 118, such as a graphical user interface or menu for a drive mode selector. The one or more driving modes may include a luxury mode, an off-road mode, a normal driving mode and/or a sports mode. Each of the one or more driving modes may be associated or mapped to different loads on the one or more torsion bars 112.

For example, when the sport mode is selected, the torsion bar system 100 may adjust the pre-load on each of the one or more torsion bars 112 so the torsion bars 112 are set so that the initial ride height of the wheels 114 are lower than the normal mode, which allows less body roll than the normal mode. In another example, when the luxury mode is selected, the torsion bar system 100 may adjust the pre-load of each of the one or more torsion bars 112 so the torsion bars 112 are set so that the initial ride height of the wheels 114 is higher than the normal mode, which allows for more body roll. This causes the vehicle 102 to have a higher ride height than the normal mode and so undulations or unevenness in the road surface are not felt, as much, by occupants of the vehicle 102 when the vehicle 102 traverses the undulations or unevenness in the road surface.

In another example, when the off-road mode is selected, the torsion bar system 100 may adjust the pre-load of each of the one or more torsion bars 112 so the torsion bars 112 are set so that the initial ride height of the wheels 114 is at a maximum, which is higher than when the normal mode or the luxury mode is selected and allows for the most body roll. This causes the wheels 114 to be set to have the maximum clearance above the road surface and allows the vehicle 102 to traverse large obtrusions in the road surface. When the different driving modes are selected, the torsion bar system 100 may also allow for the bound dampening force on the shock absorbers to be adjusted based on the driving modes.

The torsion bar system 100 may obtain navigational map information including one or more road features (304). The torsion bar system 100 may obtain the navigational map information including the one or more road features and their corresponding locations using the navigation unit 124. The one or more road features may include one or more undulations in the road surface, such as a speed bump. The one or more road features may include other road features, such as potholes or road debris, which may affect the smoothness of the road surface and may cause a vertical deflection that affects the ride quality.

The torsion bar system 100 may measure a height of each wheel 114 (306). The torsion bar system 100 may measure the height of each wheel using a height sensor 116b. A height sensor 116b may be positioned at or near each wheel 114 of the vehicle 102. Each height sensor 116b may detect the ride height of each wheel 114 and provide a signal to the ECU 108 that indicates the individual height of each wheel 114. The ECU 108 obtains the individual height of each wheel 114 and uses the heights to determine the roll of the vehicle 102.

Once the height of each wheel 114 is obtained, the torsion bar system 100 may determine the roll or roll angle of the vehicle 102 (308). The torsion bar system 100 may determine the roll or roll angle (hereinafter, "roll") of the vehicle 102 based on the height of each of the one or more wheels 114. The roll is the angle of lean from the vertical angle that is caused due to the centripetal force, which acts on the vehicle 102 when negotiating corners during a turn. The roll is the differences between the groundline and the body in the angle of the car that is to be achieved. The torsion bar system 100 may compare the height of each of the one or more wheels 114 on the driver side of the vehicle 102 to the height of each of the one or more wheels 114 on the passenger side of the vehicle 102. The torsion bar system 100 may calculate a difference between the heights of the wheels 114 on the driver side and the heights of the wheels 114 on the passenger side to determine the roll of the vehicle 102.

The torsion bar system 100 may measure the yaw of the vehicle 102 (310). The yaw of the vehicle 102 (or the "yaw rotation, rate or velocity") is a movement around the yaw axis of the vehicle 102 that changes the direction the vehicle 102 is pointing, to the left or right of its direction of motion. The yaw happens when the weight of the vehicle 102 shifts from its center of gravity to the left or the right. The yaw rate or yaw velocity of the vehicle is the angular velocity of this rotation, or rate of change of the heading angle when the vehicle is horizontal. The torsion bar system 100 may use a yaw sensor 116d, such as a gyroscope or accelerometer, to measure the yaw rotation. The yaw may be measured by measuring the ground velocity at two geometrically separated points within the body or may use a gyroscope or be synthesized from an accelerometer.

The torsion bar system 100 may measure a pitch of the vehicle 102 (312). The torsion bar system 100 may use a pitch sensor to measure the pitch of the vehicle 102. The pitch of the vehicle 102 is the shift in the weight of the vehicle 102 forwards or backwards. For example, when there is a heavy load on the rear of the vehicle 102 the front of the vehicle 102 pitches or angles upward. In another example, when the vehicle 102 brakes, the front of the vehicle 102 may pitch or angle downward while the rear of the vehicle 102 may pitch or angle upward. When a weight of the vehicle 102 moves forward or backwards—from the back to the front or from the front to the back—one end of the vehicle may drop while the opposite end of the vehicle may lift.

The torsion bar system 100 may capture image data of the surrounding environment of the vehicle 102 (314). The torsion bar system 100 may have a camera 116a positioned on the front of the vehicle 102 and/or positioned on the rear of the vehicle 102. When the vehicle 102 is moving forward, the camera 116a positioned in the front of the vehicle 102 may capture image data in front of the vehicle 102. The image data may include undulations or other road features in the road surface that are in the path of the vehicle 102 when the vehicle 102 is moving forward. When the vehicle 102 is moving in reverse, the camera 116a positioned in the rear of the vehicle 102 may capture image data in the rear of the vehicle 102. The image data may include undulations or other road features in the road surface that are in the path of the vehicle 102 when the vehicle 102 is moving in reverse.

Once the sensor data, image data, navigation map information and/or the driving mode are obtained, determined or measured, the torsion bar system 100 determines the load for each of the one or more torsion bars 112 (316). The torsion bar system 100 may apply different loads for each of the one or more torsion bars 112 and balance the loads for each of the one or more torsion bars 112 to optimize the ride quality of the ride. The torsion bar system 100 may map the sensor data, image data, navigational map information and/or the driving mode to different loads on the one or more torsion bars 112.

Once the load for each of the one or more torsion bars 112 is determined, the torsion bar system 100 sets the position of each of the one or more torsion bars 112 (318). The torsion bar system 100 sets the position of each torsion bar 112 based on the determined load for each torsion bar 112. The ECU 108 may cause each actuator 120 for each torsion bar 112 to twist or wind to apply torque to the corresponding torsion bar 112, which causes the ride height of the corresponding wheel 114 to increase and/or to untwist or unwind to release torque of the corresponding torsion bar 112, which causes the ride height of the corresponding wheel 114 to decrease. Since the torsion bar system 100 sets the position of each of the one or more torsion bars 112, independently, of the other torsion bars 112, the torsion bar system 100 controls the ride height of each wheel 114 independently.

In some implementations, the one or more actuators 120 may apply or release the torque upon receiving a control signal from the electronic control unit 108. The rate that the torque is applied or released may be based on the rate of change in the sensor data that is measured or determined. As the magnitude of the change in the sensor data increases, the rate of change of the torque that is applied or released may be increased. And as the magnitude of the change in the sensor data decreases, the rate of change of the torque may be decreased. The rate may be limited by a threshold safety margin to prevent damage to the components of the torsion bar system 100.

Figure 4:
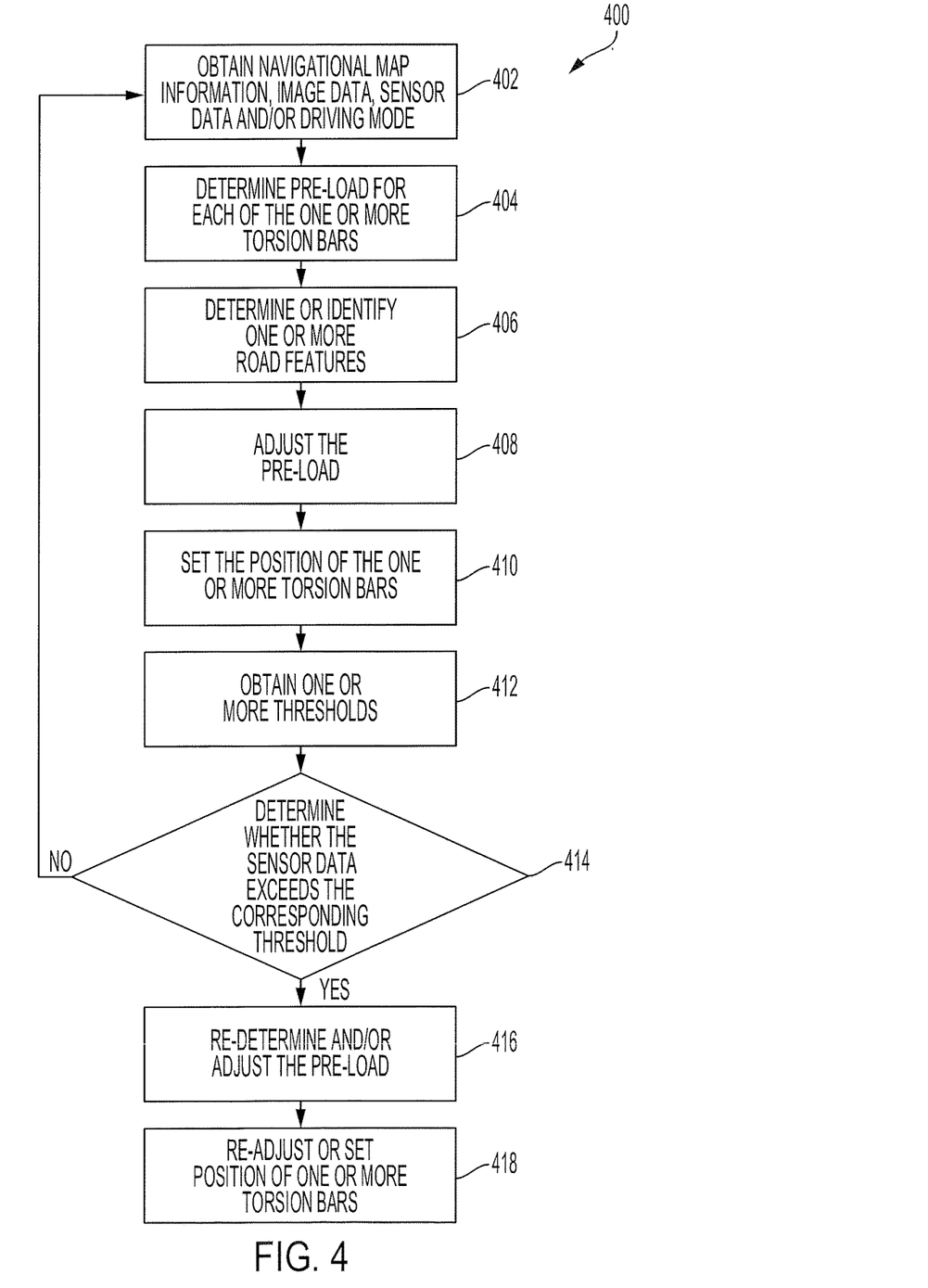
FIG. 4 is a flow diagram of an example process adjusting the load or pre-load of the one or more torsion bars using the active torsion bar system of FIG. 1 according to an aspect of the invention.

FIG. 4 is a flow diagram of a process 400 for setting the load or pre-load of the one or more torsion bars 112. One or more computers or one or more data processing apparatuses, for example, the ECU 108 of the torsion bar system 100 of FIG. 1, appropriately programmed, may implement the process 400.

The torsion bar system 100 obtains the navigational map information, the image data, sensor data and/or the driving mode, as described above (402). Once the navigational map information, the image data, sensor data and/or the driving mode are obtained, measured or determined, the torsion bar system 100 may determines the pre-load for each of the one or more torsion bars 112 based on the driving mode (404). The torsion bar system 100 may set or determine the initial or baseline pre-load based on the driving mode, and may reconfigure the initial or baseline pre-load while driving if the torsion bar system 100 receives user input indicating a change in the driving mode from one driving mode to another or other information. The different driving modes may include a luxury mode, a normal mode, a sports mode and an off-road mode.

The normal mode may be the default driving mode where the torsion bar system 100 is balanced and applies a torque of approximately 45%-55% of the maximum applied torque to each of the one or more torsion bars 112 so that the vehicle 102 is balanced and the ride heights for each of the one or more wheels 114 is substantially equivalent. This may be the default ride height and allow the vehicle 102 to remain planar to a flat road surface with no incline or angle and provides for a ride quality that is smooth yet responsive to deformations in the road surface.

When the driving mode is the luxury mode, the torsion bar system 100 may apply approximately 55%-65% of the maximum applied torque for each of the one or more torsion bars 112. This increases the ride height in comparison to the normal mode and the sports mode, which allows undulations, potholes or other deformations in the road surface to be absorbed. Whereas, when the driving mode is the sport mode, the torsion bar system 100 may apply approximately 35%-45% of the maximum applied torque for each of the one or more torsion bars 112. This decreases the ride height in comparison to the normal mode, and so, the vehicle 102 rides lower to the road surface. In another example, when the driving mode is the off-road mode, the torsion bar system 100 may apply 75%-85% of the maximum applied torque for each of the one or more torsion bars 112. This significantly increases the ride height in comparison to all the other driving modes so that the vehicle 102 may traverse undulations or other deformation in the road surface.

Figure 6:
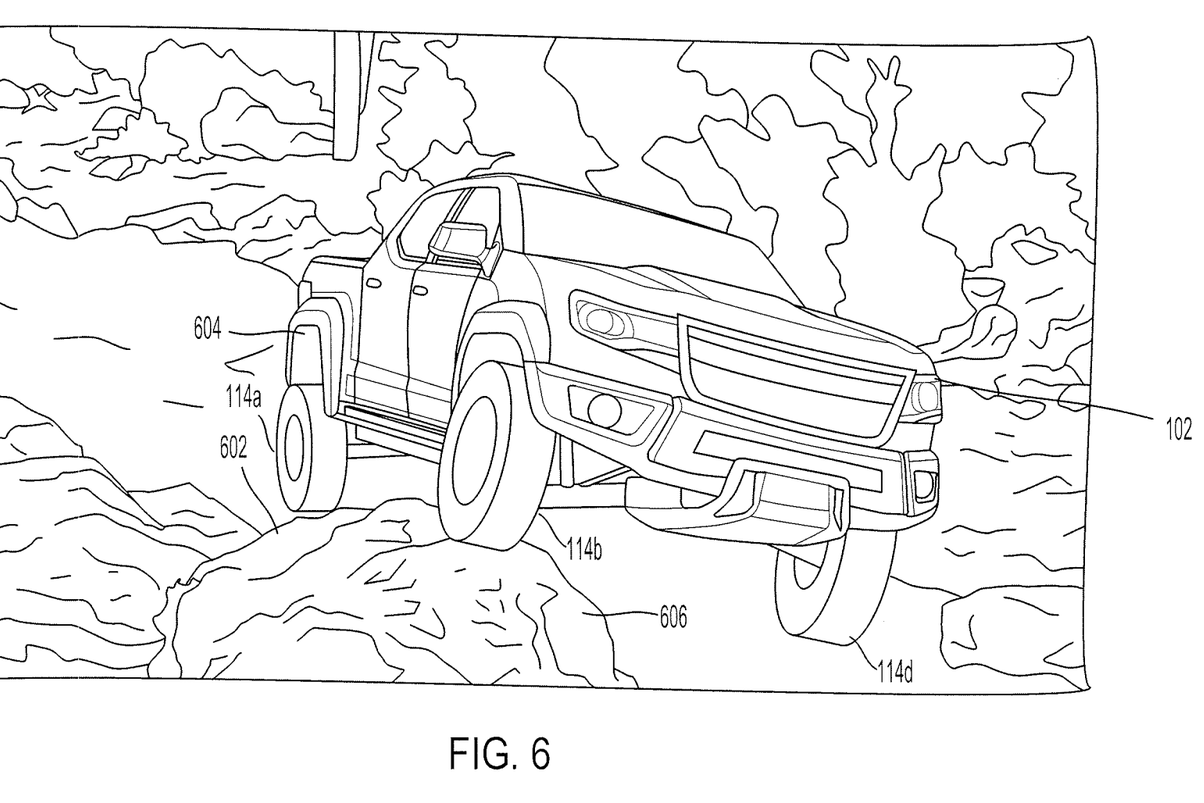
FIG. 6 shows an example use-case of the vehicle travelling off-road using the active torsion bar system of FIG. 1 according to an aspect of the invention.

For example, as shown in FIG. 6, the vehicle 102 may be travelling off-road over a rocky terrain 602, and so, an occupant may use the user interface 118 to select or set the driving mode to the off-road mode. In some implementations, the torsion bar system 100 may identify the one or more undulations or changes in the road surface and automatically switch the driving mode to one of the driving modes. For example, the torsion bar system 100 may identify the rocky terrain 602 and switch the driving mode to the off-road mode or identify other road features, such as a windy road, curve or turn, and switch the driving mode to a corresponding driving mode, such as a sport or luxury mode. By switching the driving mode to the off-road mode, the torsion bar system 100 may wind the one or more torsion bars 112 to increase the ride height 604 of the wheels 114 of the vehicle 102, which allows the vehicle 102 to traverse the rocky terrain 602 and provides a more comfortable ride to any occupants.

Once the initial or baseline pre-load is set, the torsion bar system 100 may determine or identify one or more road features (406). The torsion bar system 100 may extract the locations of the road features, such as potholes, speed bumps, or other undulations or deformations in the road surface from the navigational map information or recognize the road features from the image data. For example, the torsion bar system 100 may identify the rock 606.

The one or more road features may be an undulation or other deformation in the road surface and/or may be a change in the direction or incline of the road surface, such as a turn, a curve or an angled embankment. In some implementations, the torsion bar system 100 may identify an approaching road feature from user input, such as from an activation of a turn signal, which may indicate that a turn is approaching.

The one or more road features may cause one of the wheels 114 to behave differently than the other wheels. The torsion bar system 100 may recognize the type of road feature, e.g., whether the road feature is a speed bump, a pothole, a turn or other change in the road surface. The torsion bar system 100 may recognize the type by comparing the road feature to a database of objects to recognize the type of object and/or may extract a tag from the navigational map information that identifies the type of road feature. In some implementations, the user input indicates the type of road feature, such as right-hand turn or a left-hand turn when a turn signal is activated.

Once the torsion bar system 100 identifies or determines that there is a road feature, the torsion bar system 100 may adjust the pre-load when the location of the road feature is within a threshold distance of the current location of the vehicle 102 (408). When the road feature is within the threshold distance, the torsion bar system 100 adjusts the pre-load in response to determining that the location of the road feature is within the threshold distance to prepare the vehicle 102 to traverse the road feature. The torsion bar system 100 may compare the location of the vehicle 102, which may be obtained from the navigational map information, to the location of the road feature and when the location of the vehicle 102 is within a threshold distance of the location of the road feature perform the adjustment.

The torsion bar system 100 may determine the adjustment of the pre-load of each of the one or more torsion bars 112 based on the type and/or location of the road feature. For example, when the road feature is a pothole, the torsion bar system 100 may recognize that only the passenger-side wheels 114*a*-*b* may traverse the pothole and only adjust the torsion bars 112*a*-*b* that control the passenger-side wheels 114*a*-*b*. Thus, the torsion bar system 100 may only adjust the pre-load on the torsion bars 112 that need adjustment.

In another example, when the road feature is a turn or curve, the torsion bar system 100 may twist or wind the wheels 114 that are on the outside of the turn or curve to raise or increase the ride height of the outside wheels to prevent the outside wheels from rolling or rising and/or may untwist or unwind the wheels 114 that are on the inside of the turn or curve to lower or decrease the ride height of the inside wheels so that the wheels 114 remain in contact with the road surface during the turn or curve. This decreases the likelihood that the vehicle 102 will roll over. In another example, the torsion bar system 100 may recognize the rock 606 and that the passenger-side wheels will traverse the rock 606, and so, the torsion bar system 100 may only adjust the passenger-side wheels, e.g., by increasing the ride height, since the passenger-side wheels 114a-b traverse the rock 606.

After the torsion bar system 100 determines the pre-load for each of the one or more torsion bars 112, the torsion bar system 100 sets the position of the one or more torsion bars 112 based on the pre-load for each of the one or more torsion bars 112 (410). The torsion bar system 100 controls the one or more actuators 120 to wind or unwind the corresponding torsion bar 112 that is coupled to the actuator 120, as described above. By determining and identifying road features, the torsion bar system 100 predicts when the one or more torsion bars 112 may need to be adjusted to maintain the ride quality. Then, the torsion bar system 100 determines the pre-load for each of the one or more torsion bars 112 that are affected so that the ride quality is maintained before, during and after traversal of the road feature. Since the torsion bar system 100 determines the pre-load before the vehicle 102 traverses the road feature, the torsion bar system 100 is able to set the pre-load before the vehicle 102 traverses the road feature so the torsion bar system 100 may be predictive of the changes necessary instead of reactive.

The torsion bar system 100 may obtain one or more thresholds for the sensor data (412). Each type of sensor data may have a different threshold or range that is acceptable before the torsion bar system 100 adjusts the pre-load. The one or more thresholds may be obtained from the memory 110 and/or obtained via user input via the user interface 118. In some implementations, the one or more thresholds are pre-programmed and/or pre-configured into the memory 110. The one or more thresholds may also be based on the driving mode. For example, the one or more thresholds for the sensor data may be different for each of the one or more driving modes, and when selected, each of the one or more driving modes may map to different thresholds for the various types of sensor data.

The torsion bar system 100 may determine whether the sensor data exceeds a corresponding threshold (414). The torsion bar system 100 compares the sensor data to the corresponding threshold to determine whether the torsion bar system 100 needs to re-determine and re-adjust the pre-load for each of the one or more torsion bars 112. The sensor data may include the yaw, roll and/or pitch. The torsion bar system 100 may compare the yaw, roll and/or pitch that is determined, measured or otherwise obtained, as described above, with one or more corresponding thresholds. And, when the yaw, roll and/or pitch exceeds the one or more corresponding thresholds, this may indicate that the vehicle 102 may need to re-adjust the pre-load on one or more of the torsion bars 112 to adjust the ride height of a corresponding wheel. When the sensor data does not exceed the corresponding threshold, the torsion bar system 100 continues to monitor the sensor data while the vehicle 102 is traversing the road surface (402). The torsion bar system 100 maintains the position of the one or more torsion bars 112 while the sensor data is within the corresponding thresholds unless one or more of the other factors change, such as the sensor data or the driving mode and/or in response to a road feature.

When the sensor data exceeds the corresponding threshold, the torsion bar system 100 re-determines the pre-load and/or adjusts the pre-load on each of the one or more torsion bars 112 (416). The torsion bar system 100 re-determines the pre-load and/or adjusts the pre-load based on the sensor data. The torsion bar system 100 may re-determine and/or adjust the pre-load based on the difference between the measured or determined sensor data and their corresponding threshold. For example, as the difference is greater, the torsion bar system 100 may need to adjust the pre-load more than when the difference is less to maintain the ride quality of the wheel. By adjusting the pre-load on each of the one or more torsion bars 112 using the sensor data, the torsion bar system 100 reacts to changes to the position of the vehicle 102, such as when the vehicle 102 rolls, is pitched or otherwise is changing in orientation. When there are changes to the position of the vehicle 102, the torsion bar system 100 adjusts the position of the one or more torsion bars 112 to adjust the ride height of the wheels 114 of the vehicle 102 so that the vehicle 102 becomes more balanced to improve the ride quality.

The torsion bar system 100 re-adjusts or sets the position of the one or more torsion bars 112 based on the pre-load (418). The torsion bar system 100 uses the one or more actuators to set the position of the one or more torsion bars 112, as described above, based on the readjusted pre-load to react to changes in the position of the vehicle 102.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A torsion bar system, comprising:
   a first torsion bar configured to adjust a ride height of a first wheel of a vehicle;
   a first actuator coupled to the first torsion bar and configured to control a load on the first torsion bar;
   a first sensor configured to detect sensor data indicative of at least one of a yaw or a pitch of the vehicle;
   a second sensor configured to detect a road feature; and
   an electronic control unit coupled to the first actuator, the first sensor, and the second sensor, and configured to:
   determine the sensor data exceeds a first threshold;
   determine if the road feature is within a second threshold, the second threshold being a threshold distance from the vehicle; and
   set a position of the first torsion bar using the first actuator and based on the load on the first torsion bar when the sensor data exceeds the first threshold and the road feature is within the second threshold.

2. The torsion bar system of claim 1, wherein to set the position of the first torsion bar the electronic control unit is coupled to cause the first actuator to wind the first torsion bar to increase the ride height of the first wheel or cause the first actuator to unwind the first torsion bar to decrease the ride height of the first wheel.

3. The torsion bar system of claim 1, wherein the electronic control unit is configured to:
determine the load on the first torsion bar based on the sensor data.

4. The torsion bar system of claim 3, wherein the sensor is a camera positioned on a front of the vehicle or a rear of the vehicle and is configured to capture image data, wherein the electronic control unit is configured to:
recognize an object or a change in a path in the image data;
determine the load on the first torsion bar based on the object or the change in the path in the image data; and
set the position of the first torsion bar before the vehicle traverses the object or the path.

5. The torsion bar system of claim 1, wherein the sensor is a height sensor that is configured to detect a height of the first wheel, wherein the electronic control unit is configured to determine the load on the first torsion bar based on the height of the first wheel.

6. The torsion bar system of claim 1, further comprising:
a second torsion bar configured to adjust a second ride height of a second wheel of the vehicle; and
a second actuator coupled to the second torsion bar;
wherein the electronic control unit is coupled to the second actuator and is configured to:
set a position of the second torsion bar using the second actuator and based on the load on the second torsion bar.

7. The torsion bar system of claim 6, wherein the electronic control unit is configured to set the position of the second torsion bar independently of the position of the first torsion bar.

8. The torsion bar system of claim 1, further comprising:
a drive selector configured to obtain a driving mode including a luxury mode or a sport mode;
wherein the electronic control system is configured to set the position of the first torsion bar based on the configuration mode.

9. The torsion bar system of claim 8, wherein the electronic control unit is configured to:
cause the first actuator to wind the first torsion bar to increase the ride height when the driving mode is the luxury mode; and
cause the first actuator to unwind the first torsion bar to decrease the ride height when the driving mode is the sport mode.

10. The torsion bar system of claim 1, further comprising:
a height sensor on each wheel of the vehicle and configured to measure a height of each wheel of the vehicle;
wherein the electronic control unit configured to:
determine a roll of the vehicle based on the height of each wheel, and
set the position of the first torsion bar based on the roll of the vehicle.

11. The torsion bar system of claim 1, further comprising:
a yaw sensor including an accelerometer or gyroscope that is configured to measure an angular velocity of the vehicle around a vertical axis; and
a pitch sensor that is configured to measure the pitch about a lateral axis of the vehicle;
wherein the electronic control unit is configured to:
set the position of the first torsion bar based on the angular velocity or the pitch of the vehicle.

12. The torsion bar system of claim 1, wherein the road feature is one or more undulations or deformations in the road surface, a speed bump, a pothole, road debris, a windy road, a curve, a turn, or other change in the road surface.

13. A torsion bar system, comprising:
a first torsion bar configured to adjust a ride height of a first wheel of a vehicle;
a first actuator coupled to the first torsion bar and configured to apply a first torque to wind or unwind the first torsion bar;
a first sensor configured to detect sensor data indicative of at least one of a yaw or a pitch of the vehicle;
a second sensor configured to detect a road feature; and
an electronic control unit coupled to the first actuator, the first sensor, and the second sensor, and configured to:
determine the sensor data exceeds a first threshold;
determine if the road feature is within a second threshold, the second threshold being a threshold distance from the vehicle; and
set a position of the first torsion bar using the first actuator when the sensor data exceeds the first threshold and the road feature is within the second threshold.

14. The torsion bar system of claim 13, further comprising:
a second torsion bar configured to adjust a ride height of a second wheel of the vehicle;
a second actuator coupled to the second torsion bar and configured to apply a second torque to wind or unwind the second torsion bar, wherein the first torque is different from the second torque; and
wherein the electronic control unit is configured to set a position of the second torsion bar using the second actuator.

15. The torsion bar system of claim 14, wherein the first torsion bar and the second torsion bar are not coupled together, wherein the electronic control unit is configured to set the position of the second torsion bar independently of the position of the first torsion bar.

16. The torsion bar system of claim 13, further comprising:
a camera positioned on a front of the vehicle or a rear of the vehicle and is configured to capture image data, wherein the electronic control unit is configured to:
recognize an object or a change in a path in the image data;
determine a first load on the first torsion bar and a second load on the second torsion bar based on the object or the change in the path in the image data; and
set the position of the first torsion bar and the second torsion bar before the vehicle traverses the object or the path based on the first load and the second load.

17. The torsion bar system of claim 13, further comprising:
a drive selector configured to obtain a driving mode including a luxury mode or a sport mode;
wherein the electronic control system is configured to set the position of the first torsion bar based on the configuration mode.

18. The torsion bar system of claim 17, wherein the electronic control unit is configured to:
cause the first actuator to wind the first torsion bar to increase the ride height when the driving mode is the luxury mode; and
cause the first actuator to unwind the first torsion bar to decrease the ride height when the driving mode is the sport mode.

19. A method for adjusting a ride height of a vehicle, comprising:
obtaining, by a processor, first sensor data indicative of at least one of a yaw or a pitch of the vehicle;

obtaining, by a processor, second sensor data indicative of a road feature;

determining, by the processor, the first sensor data exceeds a first threshold;

determining, by the processor, if the road feature is within a second threshold, the second threshold being a threshold distance from the vehicle;

determining, by the processor, a load or an amount of torque to apply to a torsion bar of the vehicle based on the first sensor data; and winding or unwinding a first torsion bar based on the load or the amount of torque to apply to decrease or increase the ride height when the first sensor data exceeds the first threshold and the road feature is within the second threshold.

20. The method of claim 19, further comprising:

obtaining a driving mode including a luxury mode or a sport mode;

wherein winding or unwinding the first torsion bar is based on the driving mode.

21. The method of claim 20, wherein winding or unwinding the first torsion bar based on the load or the amount of torque to apply to decrease or increase the ride height includes:

winding the torsion bar to increase the ride height when the driving mode is the luxury mode; and unwinding the first torsion bar to decrease the ride height when the driving mode is the sport mode.

* * * * *